United States Patent
Panda et al.

(10) Patent No.: US 11,614,941 B2
(45) Date of Patent: Mar. 28, 2023

(54) SYSTEM AND METHOD FOR DECOUPLING OPERATIONS TO ACCELERATE PROCESSING OF LOOP STRUCTURES

(71) Applicant: QUALCOMM Incorporated, San Diego, CA (US)

(72) Inventors: Amrit Panda, Redmond, WA (US); Francisco Perez, San Diego, CA (US); Karamvir Chatha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 15/942,344

(22) Filed: Mar. 30, 2018

(65) Prior Publication Data
US 2019/0303156 A1 Oct. 3, 2019

(51) Int. Cl.
*G06F 9/32* (2018.01)
*G06F 9/30* (2018.01)
*G06F 9/38* (2018.01)
*G06N 3/063* (2023.01)

(52) U.S. Cl.
CPC .......... *G06F 9/325* (2013.01); *G06F 9/30065* (2013.01); *G06F 9/3877* (2013.01); *G06N 3/063* (2013.01)

(58) Field of Classification Search
CPC .... G06F 9/325; G06F 9/30065; G06F 9/3877; G06N 3/063
USPC .......................................................... 712/34
See application file for complete search history.

(56) References Cited

U.S. PATENT DOCUMENTS

| | | | | |
|---|---|---|---|---|
| 5,507,027 A * | 4/1996 | Kawamoto | ............. | G06F 9/325 712/241 |
| 5,634,047 A * | 5/1997 | Getzlaff | ............. | G06F 9/30058 712/241 |
| 5,657,485 A * | 8/1997 | Streitenberger | ........ | G06F 9/325 711/217 |
| 5,710,913 A * | 1/1998 | Gupta | ....................... | G06F 1/32 712/227 |
| 5,968,114 A * | 10/1999 | Wentka | .................... | G06F 9/345 712/E9.039 |
| 7,100,019 B2 * | 8/2006 | Norris | ................... | G06F 9/30036 712/7 |
| 7,330,964 B2 * | 2/2008 | Tran | .................... | G06F 9/30036 712/241 |
| 7,634,137 B2 | 12/2009 | Simard et al. | | |
| 7,975,134 B2 * | 7/2011 | Gonion | ................... | G06F 8/443 712/13 |

(Continued)

*Primary Examiner* — Shawn Doman
(74) *Attorney, Agent, or Firm* — ArentFox Schiff LLP

(57) ABSTRACT

An apparatus for hardware acceleration for use in operating a computational network is configured for determining that a loop structure including one or more loops is to be executed by a first processor. Each of the one or more loops includes a set of operations. The loop structure may be configured as a nested loop, a cascaded or a combination of the two. A second processor may be configured to decouple overhead operations of the loop structure from compute operations of the loop structure. The apparatus accelerates processing of the loop structure by simultaneously processing the overhead operations using the second processor separately from processing the compute operations based on the configuration to operate the computational network.

24 Claims, 7 Drawing Sheets

(56) References Cited

U.S. PATENT DOCUMENTS

| | | | | |
|---|---|---|---|---|
| 7,987,347 B2* | 7/2011 | Wilson | ................... | G06F 9/325 |
| | | | | 712/241 |
| 8,359,462 B1* | 1/2013 | Khan | ................. | G06F 9/30189 |
| | | | | 712/215 |
| 8,543,993 B2* | 9/2013 | Yamashita | ............ | G06F 8/4432 |
| | | | | 717/150 |
| 9,710,265 B1 | 7/2017 | Temam et al. | | |
| 2003/0200426 A1* | 10/2003 | Lee | ................... | G06F 9/30181 |
| | | | | 712/241 |
| 2004/0003219 A1* | 1/2004 | Uehara | ................... | G06F 9/325 |
| | | | | 712/241 |
| 2005/0055543 A1* | 3/2005 | Moyer | ............... | G06F 9/30036 |
| | | | | 712/225 |
| 2006/0107028 A1* | 5/2006 | Meuwissen | ......... | G06F 9/30181 |
| | | | | 712/241 |
| 2006/0248520 A1* | 11/2006 | Kawabata | ............... | G06F 8/443 |
| | | | | 717/160 |
| 2008/0141013 A1* | 6/2008 | Klima | ................... | G06F 9/325 |
| | | | | 712/241 |
| 2009/0327674 A1* | 12/2009 | Codrescu | ............. | G06F 8/4452 |
| | | | | 712/241 |
| 2014/0189287 A1* | 7/2014 | Plotnikov | ........... | G06F 9/30018 |
| | | | | 712/3 |
| 2014/0351551 A1* | 11/2014 | Doerr | ................... | G06F 9/3885 |
| | | | | 711/204 |
| 2016/0147514 A1 | 5/2016 | Baskaran et al. | | |
| 2016/0306631 A1 | 10/2016 | Vorbach | | |
| 2016/0321074 A1 | 11/2016 | Hung et al. | | |
| 2019/0187963 A1* | 6/2019 | Bokhari | ............... | G06F 9/5038 |
| 2019/0278593 A1* | 9/2019 | Elango | ............... | G06F 9/30065 |

\* cited by examiner

SYSTEM AND METHOD FOR DECOUPLING OPERATIONS TO ACCELERATE PROCESSING OF LOOP STRUCTURES

BACKGROUND

Field

Certain aspects of the present disclosure generally relate to machine learning and, more particularly, to improving systems and methods of zero overhead loop execution in deep learning accelerators.

INTRODUCTION

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Deep Convolution Networks (DCNs) have shown great performance in classification problems (e.g., image recognition). The most common and compute-intensive component of DCNs is 3D convolution that is realized by a highly nested tight loop around MAD (multiply/add) instructions. In its simplest form, 3D convolution can infer up to 6-8 levels of nesting. Batch processing results in still more nesting. Tight loops tend to use a non-trivial amount of compute bandwidth in increment and comparison operations on induction variables. Unfortunately, there is a lack of architectural support for managing the bandwidth and performance demands of complex loops that are either nested or cascaded.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Deep Convolution Networks (DCNs) have shown great performance in classification problems (e.g., image recognition). The most common and compute-intensive component of DCNs is 3D convolution that is realized by a highly nested tight loop around MAD (multiply/add) instructions. In its simplest form, 3D convolution can infer up to 6-8 levels of nesting. Batch processing results in still more nesting. Tight loops tend to use a non-trivial amount of compute bandwidth in increment and comparison operations on induction variables. Unfortunately, there is a lack of architectural support for managing the bandwidth and performance demands of complex loops that are either nested or cascaded.

To address the bandwidth and performance demands of complex loops in deep learning, aspects of the present disclosure are directed to acceleration of processing loop structures.

In an aspect of the disclosure, a method, a computer-readable medium, and an apparatus of wireless communication are provided. The apparatus includes a memory and at least one processor coupled to the memory. The processor(s) are configured to determine that a loop structure comprising one or more loops each of which including a set of operations is to be executed by a first processor. The processor(s) are also configured to configure a second processor to decouple overhead operations of the loop structure from compute operations in the set of operations of the loop structure. Furthermore, the processor(s) are configured to accelerating processing of the loop structure by processing the overhead operations using the second processor separately from processing the compute operations based on the configuration to operate the computational network.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
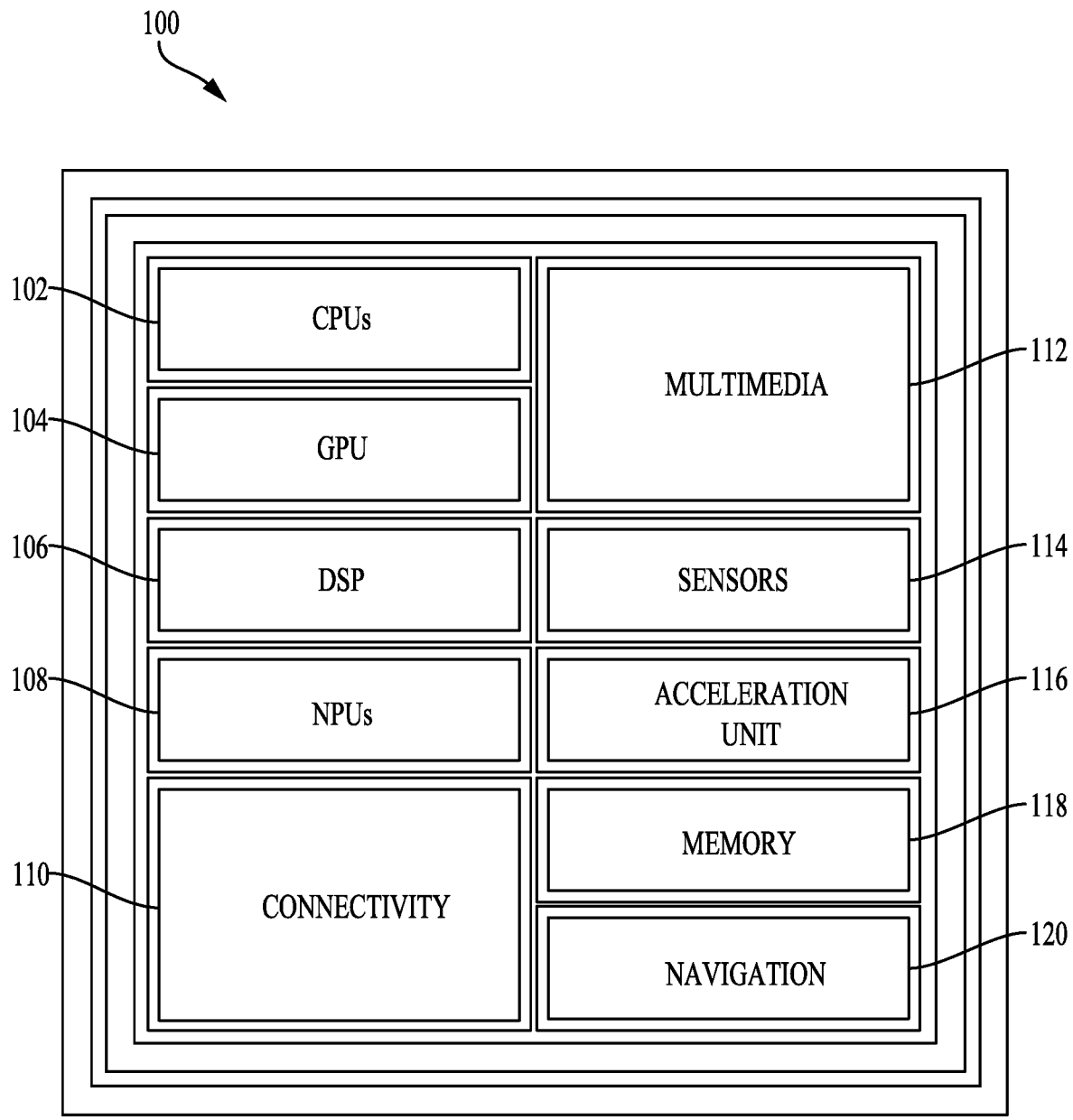
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description. The detailed description and drawings are merely illustrative of the disclosure rather than limiting, the scope of the disclosure being defined by the appended claims and equivalents thereof.

Zero Loop Overhead Execution in Deep Learning Accelerators

Deep Convolution Networks (DCNs) have shown great performance in classification problems (e.g., image recognition). The most common and compute-intensive component of DCNs is 3D convolution that is realized by a highly nested tight loop around MAD (multiply/add) instructions. In its simplest form, 3D convolution can infer up to 6-8 levels of nesting and/or cascading. Batch processing may result in still more nesting and/or cascading. Tight loops tend to use a significant amount of compute bandwidth. For example, tight loops may use significant compute bandwidth in increment and comparison operations on induction variables. Unfortunately, there is a lack of architectural support for managing the bandwidth and performance demands of complex loops that are either nested or cascaded.

Aspects of the present disclosure are directed to managing bandwidth and performance associated with nested or cascaded loops. In some aspects, an accelerator unit, which may be referred to as a stream index generator (SIG), may be configured to generate loop indices that are typically used in programming code (e.g., C code) for repetitive functions, such as generating addresses for arrays of elements in memory. The generated loop indices may be used for either computation or memory access, for example.

FIG. 1 illustrates an example implementation of the aforementioned hardware acceleration using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, acceleration unit 116, and/or navigation 120, which may include a global positioning system.

The acceleration unit 116 may be configured to determine whether a loop structure is to be executed. The acceleration unit 116 may decouple overhead instructions (e.g., instructions for determining loop boundaries or transitions between loops (e.g., increment or branch) of the loop structure from compute instructions (e.g., multiply). The acceleration unit 116 may separately process the overhead instructions while another processor (e.g., CPU 102) processes the compute instructions. Compute instructions may include instructions may be instructions other than those for determining boundaries of a loop. In some aspects, the execution of the compute instructions may be performed in the same time period as the execution of the overhead instructions (e.g., increment and compare operations on induction variables) to accelerate processing of a loop structure.

Figure 2:
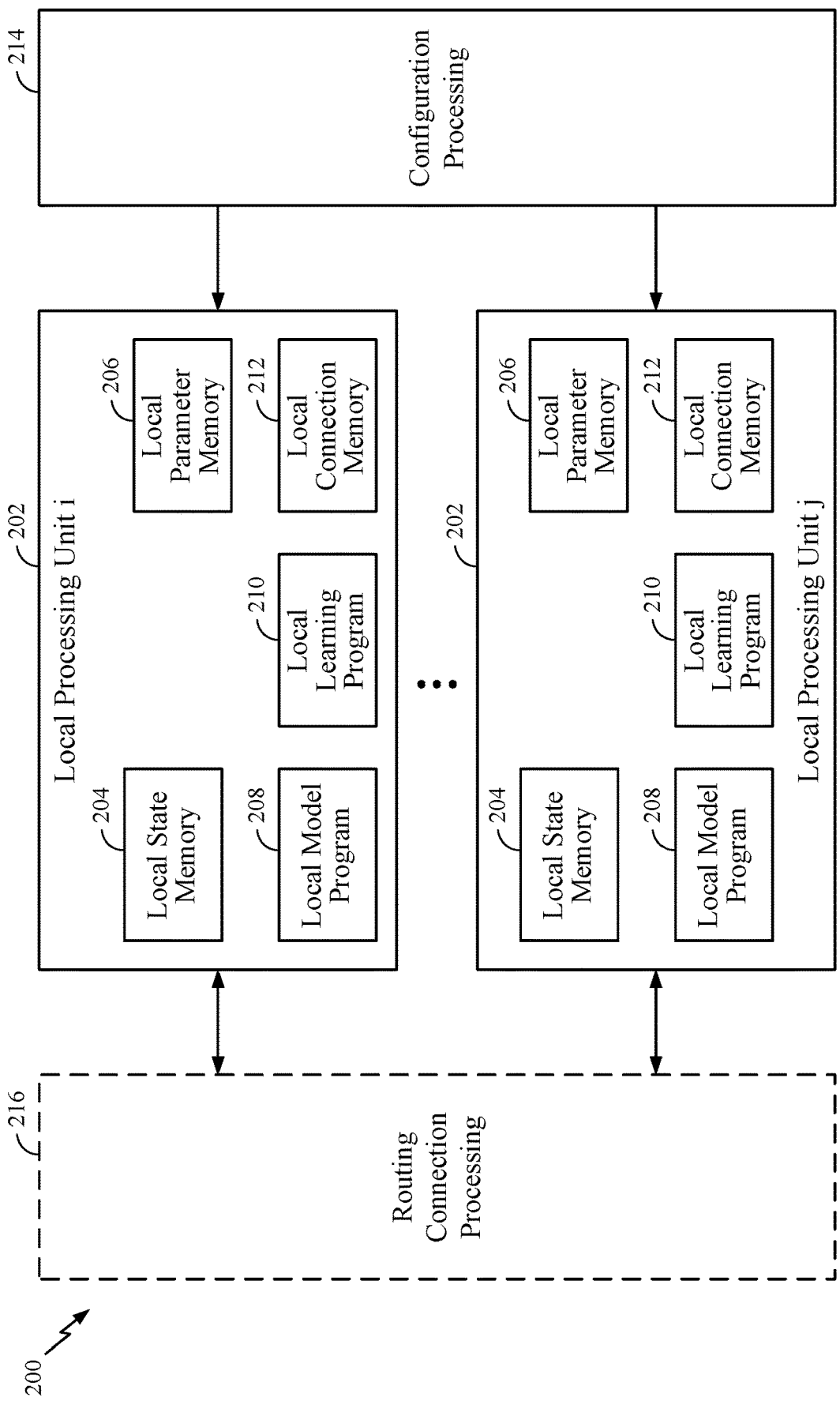
FIG. 2 illustrates an example implementation of a system in accordance with aspects of the present disclosure.

The SOC 100 may be based on an ARM instruction set. In an aspect of the present disclosure, the instructions loaded into the general-purpose processor 102 may include code for receiving an indication that a nested loop including a set of operations is to be executed by a first processor. The instructions loaded into the general-purpose processor 102 may also include code for configuring a second processor to decouple overhead operations of the nested loop from compute operations of the nested loop. The instructions loaded into the general-purpose processor 102 may further include code for accelerating processing of the nested loop by processing the overhead operations using the second processor separately from processing the compute operations based on the configuration to operate the computational network FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may include a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
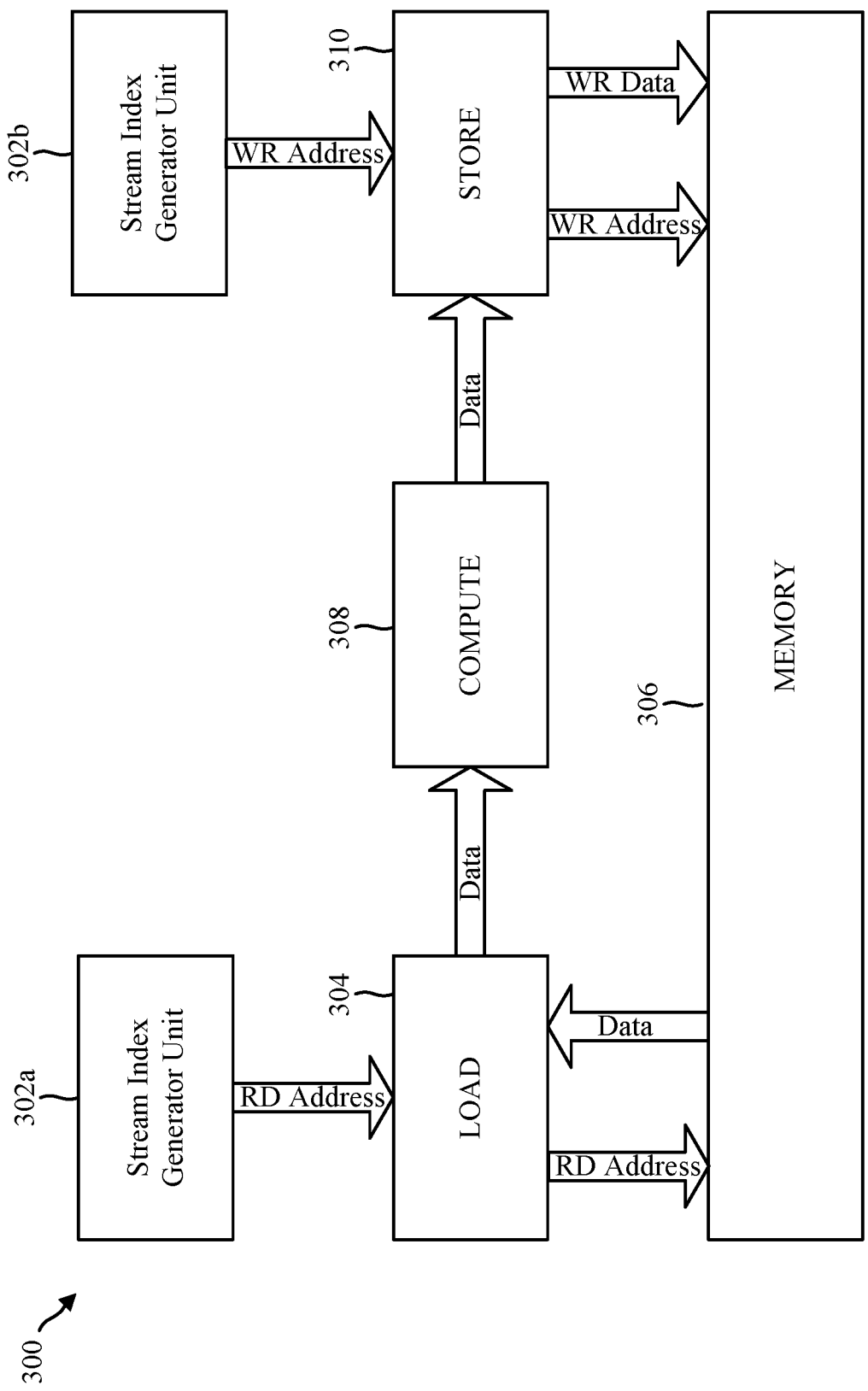
FIG. 3A is a block diagram illustrating exemplary architecture for hardware acceleration in accordance with aspects of the present disclosure.

FIG. 3A is a block diagram illustrating exemplary architecture for hardware acceleration in accordance with aspects of the present disclosure. Referring to FIG. 3A, the architecture 300 may include one or more stream index generator units (302a, 302b). Each of the stream index generator units 302a, 302b may be configured to determine that a loop structure is to be executed. The loop structure may be a nested loop, a cascaded loops or a combination thereof, for example. In some aspects, the stream index generator unit 302a, 302b may determine that a loop is to be executed based on receipt of a designated instruction. For example, when the program code includes loop definition instructions (e.g., loop0_base_curr=loop0_init), the stream index generator may determine that a loop structure is to be executed. The stream index generator 302a, 302b may in turn, decouple overhead instructions included in each loop structure from the compute instructions of the loop structure. The overhead instructions may, for instance, include, instructions for determining loop boundaries. The overhead instructions may include increment, compare, branch instructions or the like. On the other hand, compute instructions may include multiply, addition, load or the like.

The stream index generator unit 302a, 302b may generate addresses for each loop based on the loop definitions. The loop definition may specify a starting address for all of the loops (e.g., loop0_init) as well as a loop count maximum (e.g., loopx_cnt_max) that indicates how many times the loop is to be executed and a loop stride (e.g., loopx_stride) that indicates how much to increment an address after the completion of each loop.

Using the loop definitions, the steam index generator unit (e.g., 302a, 302b) determines one or more address locations in memory corresponding to a loop of the loop structure. The address may be supplied to a load unit 304 which may retrieve data from memory 306 at the determined one or more addresses. The retrieved data may be supplied to a compute unit 308 which may execute a particular computation operation (e.g., multiply). In turn, the compute unit 308 may supply the output of the computation to a store unit 310 which may store output in a memory location using an address generated via the stream index generator 302.

Accordingly, the overhead operations (e.g., determining the loop boundaries or indices) may be performed separately (e.g., via a separate processor) from the compute, load and store operations. Furthermore, the overhead operations may be performed simultaneously with the compute operations. For example, the overhead operations may be performed during the same time period in which the computer operations are performed. Accordingly, the loop structures may be implemented as zero overhead loops. That is, the overhead such as loop boundaries and indices for the loop structures may be determined by hardware rather than by software. In doing so, the processing of the loop structures may be accelerated.

Figure 3B:
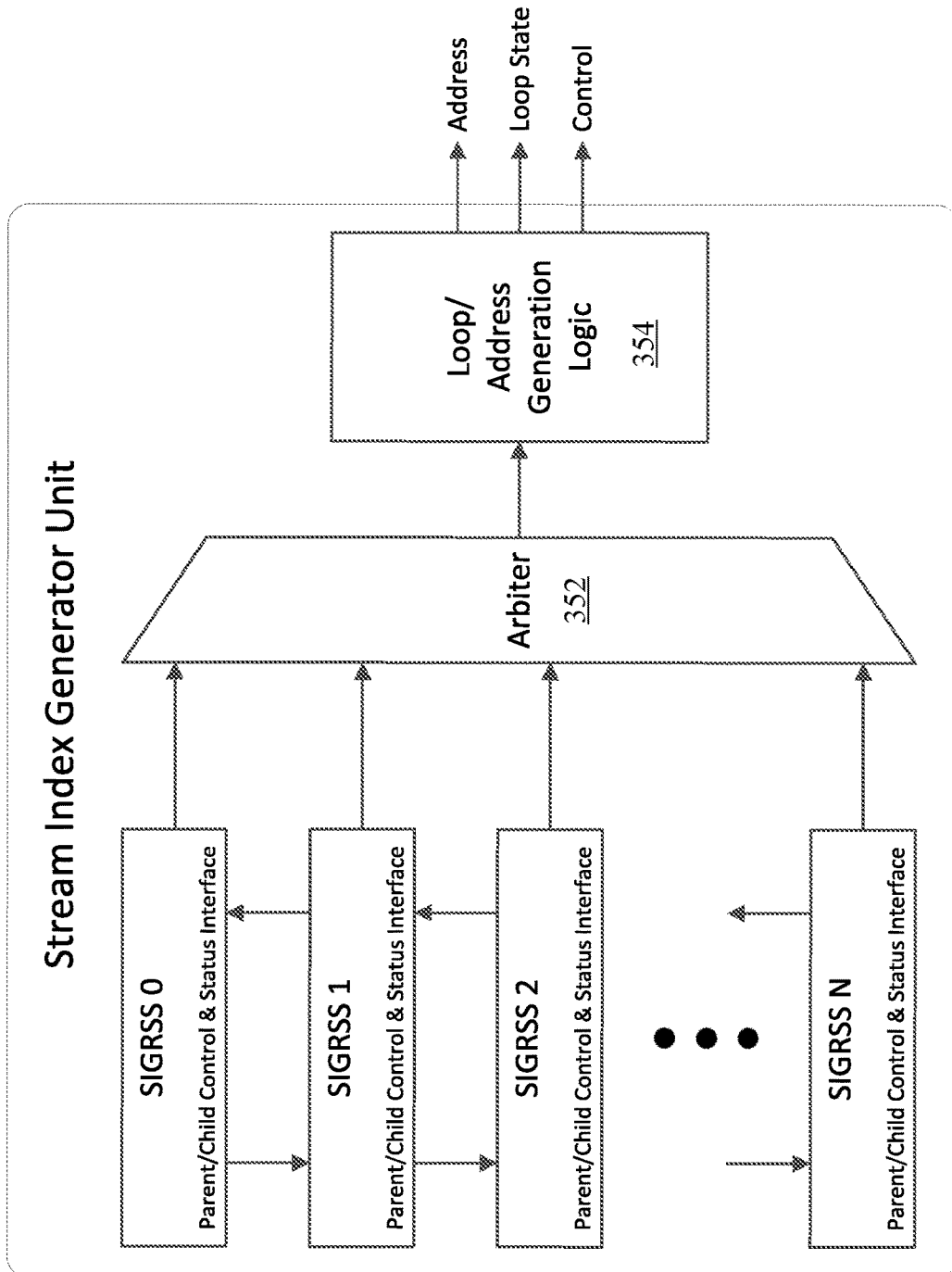
FIG. 3B is a block diagram illustrating exemplary architecture of a stream index generator unit in accordance with aspects of the present disclosure.

FIG. 3B is a block diagram illustrating exemplary architecture of a stream index generator unit in accordance with aspects of the present disclosure. As shown in FIG. 3B, the architecture of a stream index generator unit 350, may include one or more stream index generator reservation station segment (SIGRSS) components (SIGRSS0-n). Each SIGRSS component may store and/or manage an instruction within the stream index generator unit 350. In some aspects, the SIGRSS components (e.g., SIGRSS0-n) may be configured to be completely independent or may be chained together. Each SIGRSS component (e.g., SIGRSS0-n) may be configured to implement a 1, 2, 3 . . . M deep loop structure. Each SIGRSS component (e.g., SIGRSS0-n) may be configured with a parent/child interface. The parent/child interfaces may be used to chain multiple SIGRSS components together to implement different loop configurations including larger and more complex loop structures (e.g., cascading loop structures). For example, the stream index generator unit 350 may be configured to implement a mix of independent and chained loop structures simultaneously:

SIGRSS 0: Single mode, 2-deep loop
SIGRSS 1: Parent mode, 4-deep loop
SIGRSS 2: Child mode in which SIGRSS 1 is the parent, 4-deep loop a SIGRSS1 & 2 are used to implement an 8-deep loop
SIGRSS 3: Single mode, 3-deep loop
. . .

The stream index generator unit 350 may also include an arbiter 352. The arbiter 352 may be used to control access to a common loop/address generation logic component 354. The common loop address generation logic component 354 may be configured to generate an address location corresponding to a location in a memory (e.g., a physical address in memory 118). The common loop address generation logic component 354 may output the address, a loop state and control signaling (e.g., controlling a next operation according to whether the loop is a parent or child loop) to a second processor which may perform the compute operations for the corresponding loop. The common loop/address generation logic component 354 may be shared by all the SIGRSS components (e.g. SIGRSS0-N). Of course, this is merely exemplary, and in some aspects, a dedicated loop/address generation logic may be provided for each SIGRSS component (e.g., SIGRSS0-N).

Where multiple SIGRSS components are chained together, one SIGRSS may be configured as a Parent SIGRSS and one SIGRSS may be configured as the Child. For example, SIGRSS0 may be configured as a parent and SIGRSS1 may be configured as a child. However, in some aspects, a chain may including more than 2 SIGRSS components and there may be multiple parent SIGRSS components and multiple child SIGRSS components. Each SIGRSS component may have the next highest indexed SIGRSS component as its child SIGRSS component. Furthermore, each SIGRSS component (e.g., SIGRSS0-N) may have dedicated signals between parent and child to communicate when each SIGRSS has completed processing (e.g., reached a loop boundary) via the parent/child control and status interface.

In a nested parent and child mode, a parent SIGRSS (e.g., SIGRSS 1) may send a new loop0_init value to the child SIGRSS (e.g., SIGRSS 2) when the child SIGRSS signals that it has completed processing (e.g., reached a loop boundary). In some aspects, the child SIGRSS (e.g., SIGRSS 2) may be configured with the loop0_init value (e.g., in advance), such that child SIGRSS (e.g., SIGRSS 2) may begin executing without waiting for the parent to send the loop0_init value. When the child SIGRSS (e.g., SIGRSS 2) completes its loops, the child SIGRSS (e.g., SIGRSS 2) may signal completion to its parent SIGRSS (e.g., SIGRSS 1). In response, the parent SIGRSS (e.g., SIGRSS 1) may requests the stream index generator unit 350 to calculate a next loop0_init value for the child SIGRSS (e.g., SIGRSS 2). If this is the top parent SIGRSS in a multi-parent configuration, then after completing its access to the stream index generator unit 350, the parent (e.g., SIGRSS 1) may send a signal indicating completion to the child (e.g., SIGRSS 2) along with the new loop0_init value. On the other hand, if the parent (e.g., SIGRSS 1) is not the top parent in the multi-parent configuration (e.g., SIGRSS 0 is the top parent), then the parent may be termed a middle parent and may request a new loop0_init value from its parent (e.g., SIGRSS 0) based on its state, before sending the new loop0_init value to the child (e.g., SIGRSS 2). When the child (e.g., SIGRSS 2) receives an indication of completion from the parent (e.g., SIGRSS 1), the child (e.g., SIGRSS 2) may use the new loop0_init value and execute its loops.

Figure 4:
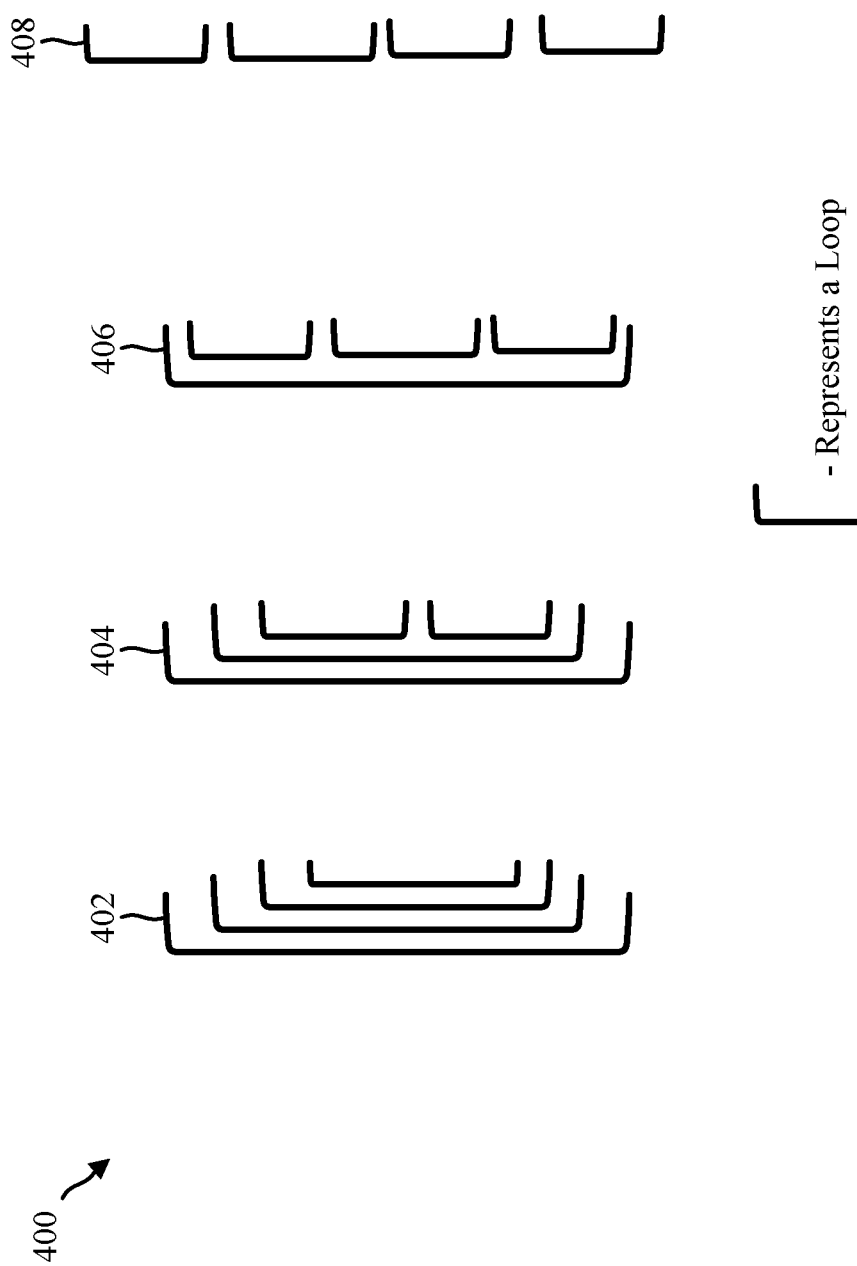
FIG. 4 illustrates exemplary structures of loops in accordance with aspects of the present disclosure.

FIG. 4 illustrates exemplary structures of loops in accordance with aspects of the present disclosure. As shown in FIG. 4, a loop structure 400 may be configured with various connective relationships or dependencies. For example, the loop structure may be configured as a set of nested loops 402 in which one loop is included inside the body of another loop. An outer loops of a nested loop (e.g., 402) triggers execution of the inner loops and controls the number times an inner loop is repeated. In another example, the loop structure may be configured as a set of cascaded loops 408. With cascaded loops (e.g., 408) the loops are not included within one another, but rather may one loop may follow another loop. Each loop of the cascaded loops 408 may independently control its number of repetitions, after which control may be passed to a subsequent loop in the cascade until all loops have been executed. Loop structures 404 and 406 illustrate examples of structures that include both nested and cascaded loops. Although, each of the loop structures shown in FIG. 4 include only four loops, this is merely exemplary and not limiting. Rather, any number of loops may be included in a loop structure.

In one example, program code including 4 nested loops may be implemented as shown below:

```
START
loop0_base_curr = loop0_init;
for (loop0_cnt_curr=0, loop0_cnt_curr <loop0_cnt_max,
loop0_cnt_curr++)
{
        loop1_base_curr = loop0_base_curr;
        for (loop1_cnt_curr=0, loop1_cnt_curr <loop1_cnt_max,
        loop1_cnt_curr++)
        {
                loop2_base_curr = loop1_base_curr;
                for (loop2_cnt_curr=0, loop2_cnt_curr <
                loop2_cnt_max,
        loop2_cnt_curr++)
                {
                        loop3_base_curr = loop2_base_curr;
                        for (loop3_cnt_curr=0, loop3_cnt_curr <
                        loop3_cnt_max,
                loop3_cnt_curr++)
                        {
                                SIGOUT = loop3_base_curr;
                                loop3_base_curr += loop3_stride;
                        }
                        loop2_base_curr+=loop2_stride;
                }
                loop1_base_curr+=loop1_stride;
        }
}
```

```
    loop0_base_curr+=loop0_stride;
}
if (rollover) goto START;
```

Figure 5:
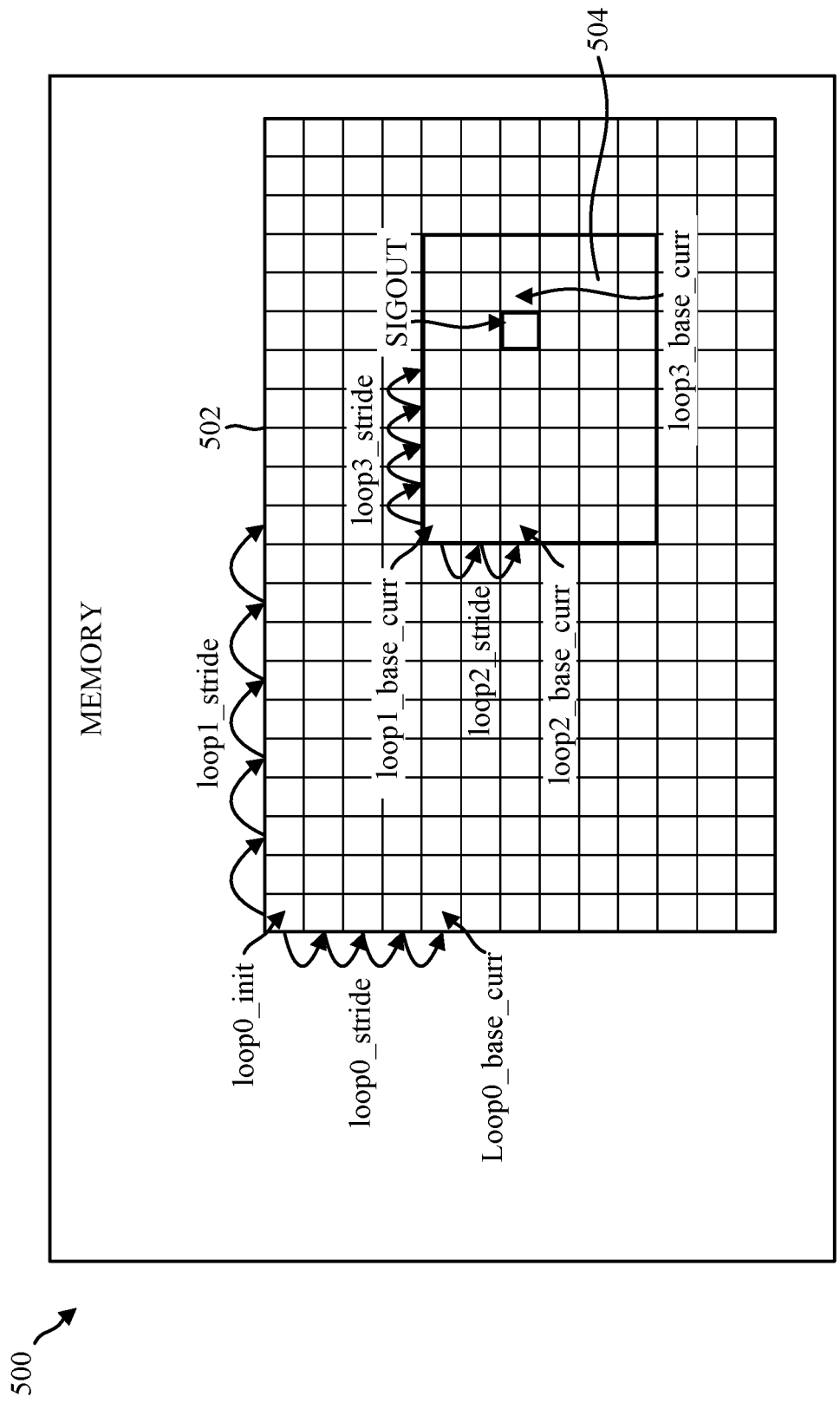
FIG. 5 is a diagram illustrating exemplary operation of an accelerator unit in accordance with aspects of the present disclosure.

FIG. 5 is a diagram illustrating exemplary operation of an accelerator unit (e.g., 116) in accordance with aspects of the present disclosure. By way of example and for illustration, the may example program code included above may be viewed as two nested windows. As shown in the example of FIG. 5, the generation of 4 nested loops may be used to form 2-D nested windows in a memory unit 500. A first window 502 may be defined by loop0 and loop1. The vertical axis of the window 502 may be defined by loop0 and horizontal axis may be defined by loop1. Of course, the axes could also be switched depending on the loop stride values for each loop. A nested window 504 may be defined by loop2 and loop3. The vertical axis of the nested window 504 may be defined by loop2 and the horizontal axis may be defined by loop3.

At the beginning of the execution, all of the loopx_base_curr values are initialized to loop0_init. Upon each execution of a segment, the inner most loop is executed. In the inner most loop (e.g., loop3), SIGOUT is set to loop3_base_curr and then loop3_base_curr may be incremented by loop3 stride. Loop3 may be executed until it has executed loop3_max_cnt times at which time loop2_base_curr may be incremented by loop2 stride. Loop3_base_curr may be then re-initialized to the new loop2_base_curr and loop3 may be executed again. After loop2_base_curr has been incremented loop2 max_cnt times, loop1_base_curr may be incremented by loop1_stride and both loop2_base_curr and loop3_base_curr are re-initialized to the new loop1_base_curr. Thereafter, both loop2 and loop3 may be executed again. After loop1_base_curr has been incremented a total of loop1_cnt_max_curr times, the value of SIGOUT may be deemed the memory address to be accessed (e.g., for reading data from or writing data to). The values loop1_base_curr, loop2_base_curr and loop3_base_curr may all be re-initialized to the new loop0_base_curr and loop1, loop2 and loop3 may be executed again.

Figure 6:
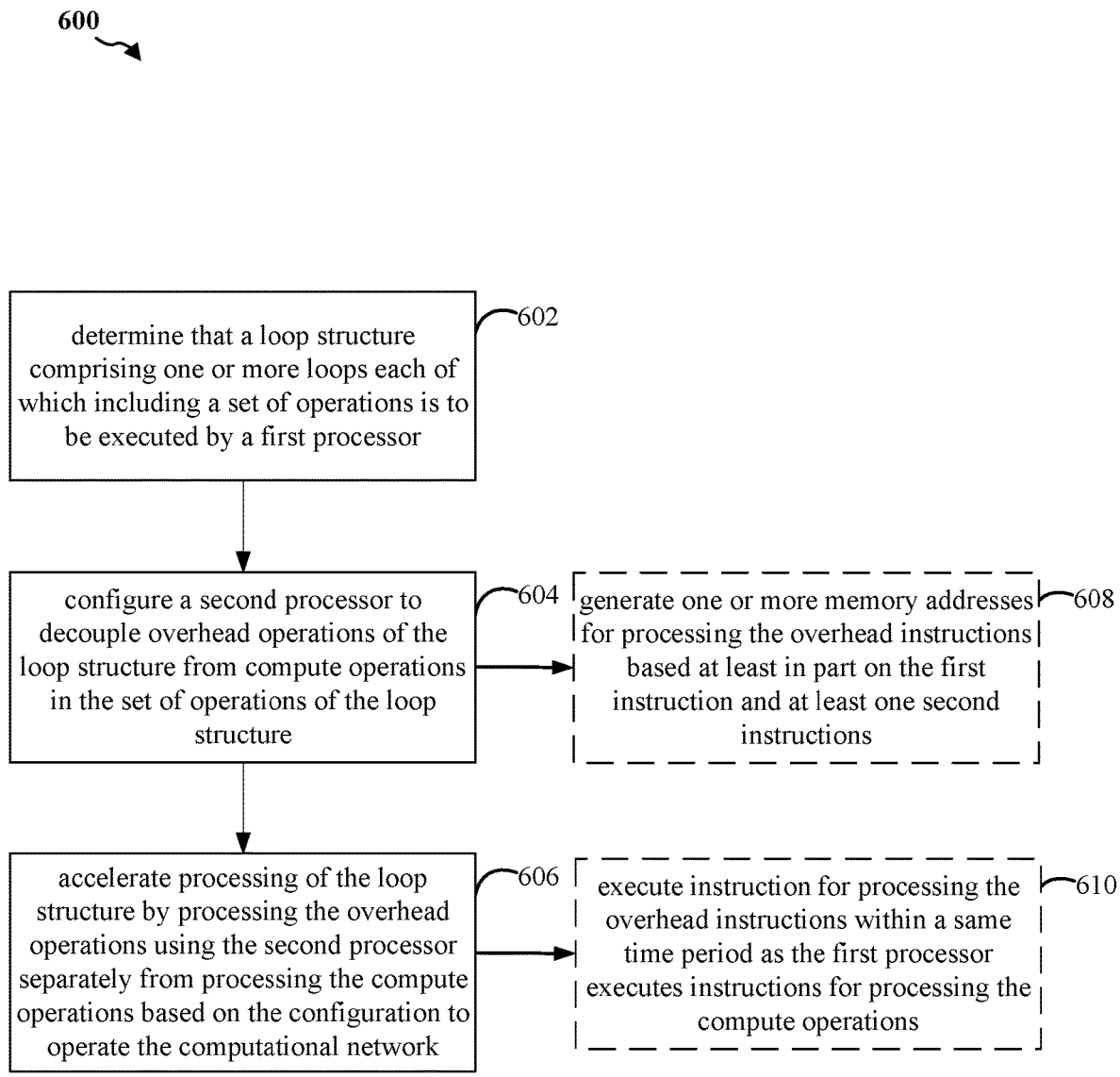
FIG. 6 illustrates a method 600 of hardware acceleration in accordance with aspects of the present disclosure.

FIG. 6 illustrates a method 600 of hardware acceleration. In block 602, the method determines that a loop structure comprising one or more loops each of which including a set of operations is to be executed by a first processor. The loop structure may include a multiple loops of program code and may be configured as a nested loop, a cascaded loop or a combination thereof. In some aspects, the determination of whether a loop structure is to be executed may be made based on a first instruction. As discussed with respect to FIG. 3A, the stream index generator unit 302a, 302b may determine that a loop is to be executed based on receipt of a designated instruction. For example, when the program code includes loop definition instructions (e.g., loop0_base_curr=loop0_init), the stream index generator may determine that a loop structure is to be executed.

In block 604, the method configures a second processor to decouple overhead operations of the loop structure from compute operations in the set of operations of the loop structure. The overhead operations may include operations associated with the determination of loop boundaries. For instance, the overhead instruction may include a branch instruction or a compare instruction. The overhead instructions may be decoupled based on the first instructions. In block 608, the second processor may optionally be configured to generate one or more memory addresses for processing the overhead instructions based at least in part on the first instruction and at least one second instructions. The second instructions may correspond to a count for each of the one or more loops of the loop structure. The generated address may be used to retrieve data from memory for performing the compute operation or for storing a result of the compute operation, for example.

Furthermore, in block 606, the process accelerates processing of the loop structure by processing the overhead operations using the second processor separately from processing the compute operations based on the configuration to operate the computational network. In block 610, the second processor may optionally execute instruction for processing the overhead instructions within a same time period as the first processor executes instructions for processing the compute operations.

In one configuration, an apparatus is configured for determining that a loop structure comprising one or more loops each of which including a set of operations is to be executed by a first processor. The apparatus is also configured for configuring a second processor to decouple overhead operations of the loop structure from compute operations in the set of operations of the loop structure. The apparatus is further configured for accelerating processing of the loop structure by processing the overhead operations using the second processor separately from processing the compute operations based on the configuration to operate the computational network. The apparatus includes a determining means, configuring means, and/or accelerating means. In one aspect, the determining means, configuring means, and/or accelerating means may be the general-purpose processor 102, program memory associated with the general-purpose processor 102, memory block 118, local processing units 202, stream index generator 302a, 302b and/or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, method 600 may be performed by the SOC 100 (FIG. 1), the system 200 (FIG. 2) or architecture 300 (FIG. 3). That is, each of the elements of method 600 may, for example, but without limitation, be performed by the SOC 100 or the system 200 or one or more processors (e.g., CPU 102 and local processing unit 202), one or more stream index generators (e.g., stream index generator 302a) and/or other components included therein.

In one configuration, an apparatus for hardware acceleration for operating a computational network includes means for determining that a loop structure including one or more loops is to be executed by a first processor. Each of the one or more loops includes a set of operations. The apparatus further includes means for configuring a second processor to decouple overhead operations of the loop structure from compute operations in the set of operations of the loop structure. The apparatus further includes means for accelerating processing of the loop structure by processing the overhead operations using the second processor separately from processing the compute operations based on the configuration to operate the computational network.

In one configuration, the overhead operations include first operations associated with the computation of loop boundaries. In one configuration, the overhead operations are decoupled based at least in part on a first instruction. In one configuration, the apparatus includes means for generating one or more memory addresses for processing the overhead operations based at least in part on the first instruction and at least one second instructions. The at least one second instructions correspond to a count for each of the one or more loops of the loop structure. In one configuration, the loop structure includes a nested loop, a cascade of loops or a combination thereof. In one configuration, the apparatus further includes means for executing instructions for processing the overhead operations within a same time period as the first processor executes instructions for processing the compute operations. The aforementioned means may be performed by one or more of the CPUs 102, NPUs 108, and/or acceleration unit 116.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may include one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of hardware acceleration for operating a computational network, comprising:

determining that a loop structure comprising a set of loops is to be executed by a first processor, each of the set of loops including a set of operations;

configuring a second processor to decouple overhead operations from compute operations in the sets of operations of the set of loops of the loop structure; and accelerating processing of the loop structure by processing the overhead operations using the second processor based on the configuring of the second processor, and separately processing the compute operations using the first processor, the overhead operations comprising determining a set of memory addresses for each of the set of loops based on a starting address of a loop of the set of loops, a count of the loop, and a stride value of the loop, wherein each respective loop of at least two loops of the set of loops is executed with a respective base value that is set for an iteration of the respective loop, wherein the respective base value indicates a memory address of the set of memory addresses to be accessed, and wherein the respective base value is set by incrementing a respective other base value of a parent loop of the respective loop by a respective other stride value that corresponds to the parent loop of the respective loop.

2. The method of claim 1, wherein the overhead operations include first operations associated with computation of loop boundaries.

3. The method of claim 1, wherein the overhead operations are decoupled based at least in part on a first instruction.

4. The method of claim 3, wherein the second processor generates one or more memory addresses for processing the overhead operations based at least in part on the first instruction and at least one second instructions, the at least one second instructions corresponding to a count for each of the set of loops of the loop structure.

5. The method of claim 1, wherein the loop structure comprises a nested loop, a cascade of loops or a combination thereof.

6. The method of claim 1, wherein the second processor executes instructions for processing the overhead operations within a same time period as the first processor executes instructions for processing the compute operations.

7. An apparatus for hardware acceleration for operating a computational network, comprising:
means for determining that a loop structure comprising a set of loops is to be executed by a first processor, each of the set of loops including a set of operations;
means for configuring a second processor to decouple overhead operations from compute operations in the sets of operations of the set of loops of the loop structure; and
means for accelerating processing of the loop structure by processing the overhead operations using the second processor based on configuring the second processor, and separately processing the compute operations using the first processor, the overhead operations comprising determining a set of memory addresses for each of the set of loops based on a starting address of a loop of the set of loops, a count of the loop, and a stride value of the loop, wherein each respective loop of at least two loops of the set of loops is executed with a respective base value that is set for an iteration of the respective loop, wherein the respective base value indicates a memory address of the set of memory addresses to be accessed, and wherein the respective base value is set by incrementing a respective other base value of a parent loop of the respective loop by a respective other stride value that corresponds to the parent loop of the respective loop.

8. The apparatus of claim 7, wherein the overhead operations include first operations associated with computation of loop boundaries.

9. The apparatus of claim 7, wherein the overhead operations are decoupled based at least in part on a first instruction.

10. The apparatus of claim 9, wherein the means for configuring the second processor is configured to:
generate one or more memory addresses for processing the overhead operations based at least in part on the first instruction and at least one second instructions, the at least one second instructions corresponding to a count for each of the set of loops of the loop structure.

11. The apparatus of claim 7, wherein the loop structure comprises a nested loop, a cascade of loops or a combination thereof.

12. The apparatus of claim 7, wherein the means for accelerating processing of the loop structure is configured to:
execute instructions for processing the overhead operations within a same time period as the first processor executes instructions for processing the compute operations.

13. A non-transitory computer readable medium storing executable code for hardware acceleration, comprising code to:
determine that a loop structure comprising a set of loops is to be executed by a first processor, each of the set of loops including a set of operations;
configure a second processor to decouple overhead operations from compute operations in the sets of operations of the set of loops of the loop structure; and
accelerate processing of the loop structure by processing the overhead operations using the second processor based on the configuration of the second processor, and separately processing the compute operations using the first processor, the overhead operations comprising determining a set of memory addresses for each of the set of loops based on a starting address of a loop of the set of loops, a count of the loop, and a stride value of the loop, wherein each respective loop of at least two loops of the set of loops is executed with a respective base value that is set for an iteration of the respective loop, wherein the respective base value indicates a memory address of the set of memory addresses to be accessed, and wherein the respective base value is set by incrementing a respective other base value of a parent loop of the respective loop by a respective other stride value that corresponds to the parent loop of the respective loop.

14. The non-transitory computer readable medium of claim 13, wherein the overhead operations include first operations associated with computation of loop boundaries.

15. The non-transitory computer readable medium of claim 13, further comprising code to decouple the overhead operations from the compute operations based at least in part on a first instruction.

16. The non-transitory computer readable medium of claim 15, further comprising code to generate one or more memory addresses for processing the overhead operations based at least in part on the first instruction and at least one second instructions, the at least one second instructions corresponding to a count for each of the set of loops of the loop structure.

17. The non-transitory computer readable medium of claim 13, wherein the loop structure comprises a nested loop, a cascade of loops or a combination thereof.

18. The non-transitory computer readable medium of claim 13, further comprising code to execute instructions for processing the overhead operations using the second processor within a same time period as the first processor executes instructions for processing the compute operations.

19. A hardware accelerator, comprising:
a memory; and
at least one processor coupled to the memory, the at least one processor being configured to:
determine that a loop structure comprising a set of loops is to be executed by a first processor, each of the set of loops including a set of operations;
configure a second processor to decouple overhead operations from compute operations in the sets of operations of the set of loops of the loop structure; and accelerate processing of the loop structure by processing the overhead operations using the second processor based on the configuration of the second processor, and separately processing the compute operations using the first processor, the overhead operations comprising determining a set of memory addresses for each of the set of loops based on a starting address of a loop of the set of loops, a count of the loop, and a stride value of the loop, wherein each respective loop of at least two loops of the set of loops is executed with a respective base value that is set for an iteration of the respective loop, wherein the respective base value indicates a memory address of the set of memory addresses to be accessed, and wherein the respective base value is set by incrementing a respective other base value of a parent loop of the respective loop by a respective other stride value that corresponds to the parent loop of the respective loop.

20. The hardware accelerator of claim 19, wherein the overhead operations include first operations associated with computation of loop boundaries.

21. The hardware accelerator of claim 19, wherein the at least one processor is further configured to decouple the overhead operations from the compute operations based at least in part on a first instruction.

22. The hardware accelerator of claim 21, wherein the at least one processor is further configured to generate one or more memory addresses for processing the overhead operations based at least in part on the first instruction and at least one second instructions, the at least one second instructions corresponding to a count for each of the set of loops of the loop structure.

23. The hardware accelerator of claim 19, wherein the loop structure comprises a nested loop, a cascade of loops or a combination thereof.

24. The hardware accelerator of claim 19, wherein the at least one processor is further configured to execute instructions for processing the overhead operations using the second processor within a same time period as the first processor executes instructions for processing the compute operations.

\* \* \* \* \*